8291X
J. Home,
Hammer and Hatchet.
Patented July 8, 1834.
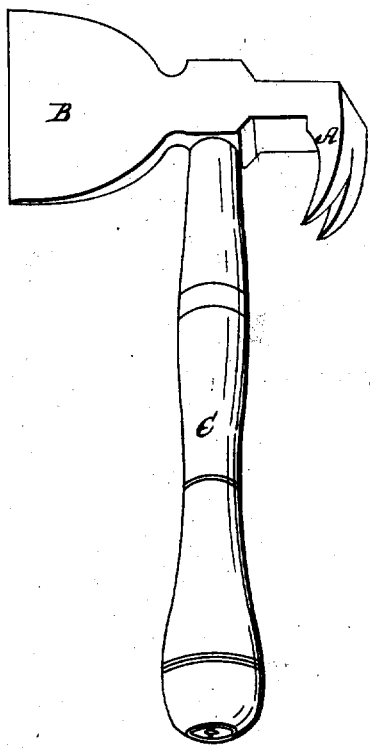

July 8. 1834

Joel Howe. Princeton Massachusetts

8291X

Letters Patent July 8. 1834.

The Schedule referred to in these Letters Patent and making part of the same containing a description in the words of the said Joel Howe himself of his Improvement in a Machine which he calls a hammer Hatchet To all to whom these presents shall come Be it known that I Joel Howe of Princeton in the County of Worcester and Commonwealth of Massachusetts have invented a new and useful Improvement in a Hammer Hatchet and that the following is a full and exact description of the construction and operation of the machine as invented or improved by me, Said Machine consists of a common Hatchet of any convenient size with a head and face like the head and face of a common nail Hammer. To this is added the claw of a common nail Hammer, placed upon the inner side of the head and even with the face of the hammer and standing in towards the handle and [illegible] [illegible] upwards towards the eye The operation of drawing nails is performed by lifting the handle. The hatchet is used as other hatchets for [illegible] and the hammer drives like other nail hammers The invention claimed consists in the combination of the hammer claw with the hatchet and hammer head and face.

Witnesses
Rufus [illegible]
William [illegible]

Joel Howe

Exd
[illegible]

Drawing

2nd [illegible]

(Patented July 8. 1834)